(12) United States Patent
Graf et al.

(10) Patent No.: US 9,663,114 B2
(45) Date of Patent: May 30, 2017

(54) METHOD AND DEVICE FOR ESTIMATING THE RESIDUAL ENERGY OF AN ENERGY ACCUMULATOR OF A MOTOR VEHICLE AND A METHOD AND DEVICE FOR OPERATING A HYBRID MOTOR VEHICLE

(71) Applicant: Continental Automotive GmbH, Hannover (DE)

(72) Inventors: Friedrich Graf, Sinzing (DE); Franz Pellkofer, Nittendorf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 2 days.

(21) Appl. No.: 14/650,195

(22) PCT Filed: Nov. 27, 2013

(86) PCT No.: PCT/EP2013/074892
§ 371 (c)(1),
(2) Date: Jun. 5, 2015

(87) PCT Pub. No.: WO2014/086643
PCT Pub. Date: Jun. 12, 2014

(65) Prior Publication Data
US 2015/0307109 A1    Oct. 29, 2015

(30) Foreign Application Priority Data
Dec. 7, 2012    (DE) .................. 10 2012 222 513

(51) Int. Cl.
*B60L 11/00* (2006.01)
*B60W 40/12* (2012.01)
(Continued)

(52) U.S. Cl.
CPC ............ *B60W 40/12* (2013.01); *B60W 10/06* (2013.01); *B60W 10/08* (2013.01); *B60W 10/26* (2013.01);
(Continued)

(58) Field of Classification Search
CPC ...... B60W 40/12; B60W 20/12; B60W 20/11; B60W 20/13; B60W 50/14; B60W 10/26;
(Continued)

(56) References Cited

U.S. PATENT DOCUMENTS 5,815,824 A    9/1998  Saga et al. ................ 701/22
8,170,737 B2   5/2012  Tate, Jr. et al. ............ 701/22
(Continued)

FOREIGN PATENT DOCUMENTS

DE          10035027 A1    1/2002  ............ B60K 6/48
DE      102010018447 A1   11/2010  ............ B60W 10/04
(Continued)

OTHER PUBLICATIONS

International Search Report and Written Opinion, Application No. PCT/EP2013/074892, 18 pages, Apr. 25, 2014.

*Primary Examiner* — Mary Cheung
(74) *Attorney, Agent, or Firm* — Slayden Grubert Beard PLLC

(57) ABSTRACT

A method is disclosed for estimating the residual energy of an electric energy accumulator that supplies an electric assistance traction drive of a motor vehicle with electrical energy. The method includes determining a future operating intensity of the assistance traction drive based on at least one input that characterizes the driving style of a section of route lying ahead, and reserving an energy component of a total quantity of energy available from the energy accumulator. The reserved energy component is determined from the determined future operating intensity based on a predefined
(Continued)

consumption parameter. The consumption parameter characterizes the drive-specific consumption of electrical energy via the electrical assistance traction drive. The method further includes estimating the residual energy by reducing the total amount of energy available by the reserved energy component.

7 Claims, 1 Drawing Sheet

(51) Int. Cl.

| | | |
|---|---|---|
| *B60W 50/00* | (2006.01) | |
| *B60W 10/06* | (2006.01) | |
| *B60W 10/08* | (2006.01) | |
| *B60W 10/26* | (2006.01) | |
| *B60W 50/14* | (2012.01) | |
| *B60W 20/13* | (2016.01) | |
| *B60W 20/11* | (2016.01) | |
| *B60W 20/12* | (2016.01) | |

(52) U.S. Cl.
CPC ............ *B60W 20/11* (2016.01); *B60W 20/12* (2016.01); *B60W 20/13* (2016.01); *B60W 50/0097* (2013.01); *B60W 50/0098* (2013.01); *B60W 50/14* (2013.01); *B60W 2050/146* (2013.01); *B60W 2400/00* (2013.01); *B60W 2510/244* (2013.01); *B60W 2540/00* (2013.01); *B60W 2550/12* (2013.01); *B60W 2550/142* (2013.01); *B60W 2550/143* (2013.01); *B60W 2550/146* (2013.01); *B60W 2550/402* (2013.01); *B60W 2550/408* (2013.01); *B60W 2560/02* (2013.01); *B60W 2710/06* (2013.01); *B60W 2710/08* (2013.01); *B60W 2710/244* (2013.01); *B60W 2720/103* (2013.01); *Y02T 10/6291* (2013.01); *Y02T 10/84* (2013.01); *Y10S 903/93* (2013.01)

(58) Field of Classification Search
CPC ............. B60W 10/08; B60W 50/0098; B60W 50/0097; B60W 10/06; B60W 2710/06; B60W 2540/00; B60W 2400/00; B60W 2050/146; B60W 2710/08; B60W 2550/143; B60W 2550/142; B60W 2550/12; Y02T 10/84; Y02T 10/6291; Y10S 903/93

See application file for complete search history.

(56) References Cited

U.S. PATENT DOCUMENTS

| | | | |
|---|---|---|---|
| 8,694,232 B2* | 4/2014 | Kono | B60W 40/072 340/995.24 |
| 8,812,182 B2 | 8/2014 | Hennings et al. | 701/22 |
| 2009/0259354 A1* | 10/2009 | Krupadanam | B60W 10/06 701/22 |
| 2010/0094496 A1* | 4/2010 | Hershkovitz | B60L 3/12 701/22 |
| 2011/0060495 A1* | 3/2011 | Kono | B60W 40/072 701/31.4 |
| 2011/0166733 A1 | 7/2011 | Yu et al. | 701/22 |
| 2011/0270476 A1* | 11/2011 | Doppler | B60L 11/1816 701/22 |
| 2011/0307166 A1* | 12/2011 | Hiestermann | G01C 21/32 701/119 |
| 2011/0309926 A1* | 12/2011 | Eikelenberg | G01C 21/3469 340/439 |
| 2011/0313610 A1 | 12/2011 | Riegelman et al. | 701/34.4 |
| 2012/0116626 A1 | 5/2012 | Perkins et al. | 701/22 |

FOREIGN PATENT DOCUMENTS

| | | | | |
|---|---|---|---|---|
| DE | 102010046236 A1 | 5/2011 | ............ | B60W 30/04 |
| DE | 102010007644 A1 | 8/2011 | ............... | B60K 6/52 |
| DE | 102010034444 A1 | 2/2012 | ............... | B60L 11/02 |
| DE | 102011118543 A1 | 5/2012 | ............... | B60K 6/48 |
| EP | 1136311 A2 | 9/2001 | ............... | B60K 6/20 |
| WO | 2012/126100 A1 | 9/2012 | ........... | B60W 30/188 |
| WO | 2014/086643 A1 | 6/2014 | ............ | B60W 10/04 |

\* cited by examiner

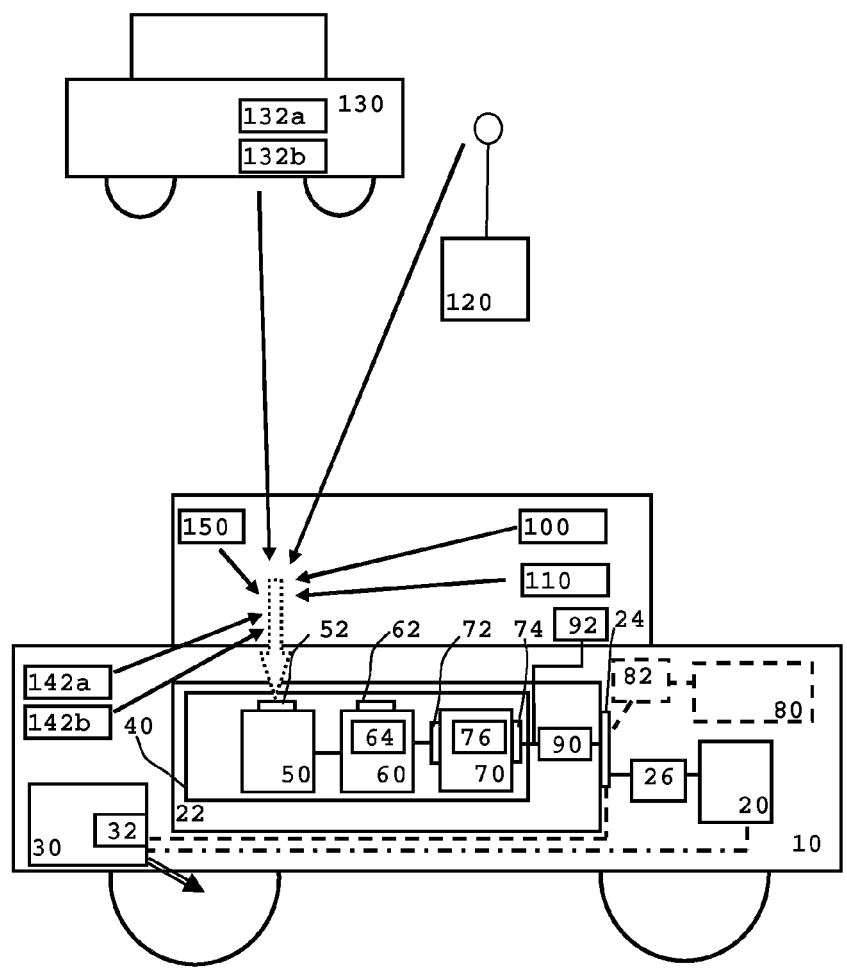

METHOD AND DEVICE FOR ESTIMATING THE RESIDUAL ENERGY OF AN ENERGY ACCUMULATOR OF A MOTOR VEHICLE AND A METHOD AND DEVICE FOR OPERATING A HYBRID MOTOR VEHICLE

CROSS-REFERENCE TO RELATED APPLICATIONS

This application is a U.S. National Stage Application of International Application No. PCT/EP2013/074892 filed Nov. 27, 2013, which designates the United States of America, and claims priority to DE Application No. 10 2012 222 513.7 filed Dec. 7, 2012, the contents of which are hereby incorporated by reference in their entirety.

TECHNICAL FIELD

In motor vehicles with an electric traction drive, a battery serves as an electric energy accumulator in order to supply the electric drive in the motor vehicle. In order to be able to use the motor vehicle reliably, it is necessary for the range which is still available to be known, said range resulting from the energy which can be retrieved from the energy accumulator.

BACKGROUND

Document DE 10 2010 007 644 A1 discloses that a two-axle motor vehicle can have an additional electric drive which drives an axle, while another axle is driven by an internal combustion engine. If therefore the additional drive is activated, the vehicle can be driven with an all-wheel function. In the specified document it is described that the additional electric drive is only used if the state of charge of the traction battery is sufficient. The possibility of electric drive is therefore available for as long as sufficient electrical energy can be retrieved. However, the driving operation for a section of route can only be insufficiently planned based on this information.

SUMMARY

One embodiment provides a method for estimating the residual energy of an electric energy accumulator which supplies an electric assistance traction drive of a motor vehicle with electrical energy, wherein the method comprises: determining a future operating intensity of the assistance traction drive based on at least one input which characterizes the driving style of a section of route lying ahead; and reserving an energy component of a total amount of energy available from the energy accumulator, wherein the reserved energy component is determined from the determined future operating intensity based on a prescribed consumption parameter which characterizes the drive-specific consumption of electrical energy by the electric assistance traction drive, and estimating the residual energy by reducing the total amount of energy available by the reserved energy component.

In a further embodiment, the future operating intensity is also determined based on a length and/or a speed profile of the section of route lying ahead.

In a further embodiment, the input which characterizes the driving style of a section of route lying ahead, is a driver's request input for activation of the assistance traction drive in a way which is referred to a point in time or to a section of route; is navigation data of a navigation system of the motor vehicle which characterizes a gradient which is above a predefined limit, a radius of a bend which is below a predefined limit, a degree of unevenness which is above a predefined limit and/or a traffic regulation prescription for the use of traction assistance measures on the section of route lying ahead; is current or general roadway state information, in particular coefficients of friction of the section of route lying ahead or current weather conditions, or current traffic conditions of the section of route lying ahead, which are output by a traffic service, and/or is vehicle state information, which is output by a vehicle traveling ahead, in particular information about the operation of all-wheel drive of the vehicle traveling ahead, information about the active operation of a driving safety system of the vehicle traveling ahead, information about an inclination of the vehicle traveling ahead, information about the operation of a flashing hazard warning system of the vehicle traveling ahead, information about an active operation of an ice warning system of the vehicle traveling ahead, or ambient temperature information of the vehicle traveling ahead; is vehicle state information, which originates from a system or sensor of the motor vehicle, in particular, information about the active operation of a driving safety system of the motor vehicle, information about an inclination of the motor vehicle, information about the operation of a flashing hazard warning system of the motor vehicle, information about an active operation of an ice warning system of the motor vehicle, or ambient temperature information of the motor vehicle; is stored information about the operation of the assistance traction drive of the motor vehicle on the section of route lying ahead when this section of route has previously been traveled along; or a combination of values which represent a plurality of the abovementioned information items.

In a further embodiment, range information is determined which is output via a display or indicating means, wherein the range information is calculated from the estimated residual energy and the consumption.

Other embodiment provides a method for operating a motor vehicle with a hybrid drive, wherein the method is performed as disclosed above, and the operation of an internal combustion engine and of the assistance traction drive of the motor vehicle is controlled as a function of the estimated residual energy.

In a further embodiment, the operation of the internal combustion engine and of the assistance traction drive is also controlled as a function of a prescribed minimum state of charge which the electric energy accumulator is to at least have at the end of the section of route lying ahead, and/or additionally as a function of a filling level of a fuel tank which supplies the internal combustion engine with fuel.

Other embodiment provides a device for estimating the residual energy of an electric energy accumulator which supplies an electric assistance traction drive of a motor vehicle with electrical energy, wherein the device comprises: an operating prediction apparatus for determining a future operating intensity of the assistance traction drive with a data input interface which is configured to receive messages or values which characterize the driving style of the section of route lying ahead; and an apportioning apparatus which has an input connection which is configured to receive a consumption parameter which characterizes the drive-specific consumption of electrical energy by the electric assistance traction drive, wherein the apportioning apparatus is also configured to assign an energy component of a total amount of energy available from the energy accumulator to a reserve, wherein the input connection of the apportioning apparatus is also configured to receive the total amount of energy available, and the apportioning apparatus is also equipped with a calculation function which determines the energy component which is assigned to the reserve, from the determined future operating intensity based on the consumption parameter, and a range correction apparatus with an input connection and an output connection, wherein the input connection of the range correction apparatus is connected to the apportioning apparatus and is as a result configured to receive from the apportioning apparatus the energy component which is assigned to the reserve, and is also equipped with a correction function which reduces the total amount of energy available by the energy component assigned to the reserve.

Other embodiment provides a control apparatus of a hybrid drive of a motor vehicle, comprising a device as disclosed above, wherein the control apparatus comprises an output connection which is configured to output control signals with which an internal combustion engine controller, an electric motor controller and an energy accumulator controller of the hybrid drive are controlled, and the control apparatus also comprises an actuating apparatus which is connected to the output connection of the range correction apparatus and to the output connection of the control apparatus, and the control apparatus is configured to control the operation of the internal combustion engine controller, of the electric motor controller and of the energy accumulator controller as a function of the estimated residual energy.

BRIEF DESCRIPTION OF THE DRAWINGS

An example embodiment of the invention is discussed below with reference to FIG. 1, which shows a motor vehicle for the purpose of a more detailed explanation of the procedure described here, in a schematic illustration.

DETAILED DESCRIPTION

Embodiments of the invention provide a procedure with which the range for which the electric drive will be available can be precisely estimated.

It has been realized that by taking into account an operating intensity of an electric assistance traction drive the range and therefore the available drive possibilities for a section of route lying ahead can be estimated precisely by estimating and, in particular, taking into account a driving style which can be expected for the section of route lying ahead. The procedure described here acquires data which relates to the section of route lying ahead, in order to infer, based on this data, for example traffic data, roadway state information, weather conditions and/or vehicle data of vehicles traveling ahead, whether, and for what distance or for what driving time, the electric additional drive will be used, in order to equip the motor vehicle with an all-wheel function. The operating intensity which is determined in this way for the assistance traction drive, which relates to the section of route lying ahead, is linked to an amount of energy which is additionally necessary.

It is therefore proposed to estimate, based on the operating intensity which is acquired from the specified data of the section of route lying ahead, the residual energy which remains by taking into account the future operating intensity. In other words, the operating intensity of the assistance traction drive is inferred for the section of route lying ahead based on the traffic data or roadway data. The estimation of the additional energy expenditure which is associated therewith serves to correct the range. This correction provides that the original range, which does not provide any all-wheel drive or any operation of the assistance traction drive, is reduced by the component (energy component or range component) which will be expected to be used for the operation of the assistance traction drive. Since the method according to the prior art does not take into account the expected operation of the electric assistance traction drive, an excessively large range is specified, with the result that at the start of travel an incorrect range is specified to the driver if, for example, the weather conditions require operation of the assistance traction drive for the section of route lying ahead. The range relates here to the electrical range, i.e. the range which can be implemented with the stored or retrievable electrical energy.

The procedure described here therefore prevents the range indication at the start of the section of route not being too high, so that a significantly shorter actual range does not surprisingly result for the driver during the travel or after the section of route, or a part thereof, has been traveled along. In particular the driver is prevented from being prompted, by an excessively high, uncorrected range indication at the start of the section of route, to carry out route planning which brings about the undesired total consumption of the electrical energy before the end of the planned section of route has been reached. In the worst case, the vehicle would be stranded, wherein in the case of a hybrid vehicle the internal combustion engine would probably have to be used to cover the last part of the section of route, without this being planned at the beginning. In particular, in the case of electric vehicles which do not have an internal combustion engine, the procedure described here can therefore prevent the vehicle becoming stranded before the section of route is completed, even though at the beginning of the section of route a sufficient range of the electric energy accumulator was indicated. In the case of electric vehicles, embodiments of the invention therefore take into account the relatively high consumption which results from all-wheel drive instead of two-wheel drive (i.e. two-axle drive instead of single-axle drive).

Taking into account the expected operating mode for the section of route lying ahead permits the range indication of an electric vehicle, which is otherwise based on single-axle drive, to be corrected, in order thereby to obtain a more precise range estimation which takes into account the additional consumption or the additional reduction in range resulting from operation in the four-wheel mode. Embodiments of the invention are therefore suitable for hybrid vehicles and electric vehicles, wherein an assistance drive is provided which is driven electrically and which is necessary to achieve four-wheel drive, but the vehicle can also be operated in a two-wheel drive mode which, depending on the type of vehicle, is assisted by an internal combustion engine or an electric motor.

According to one embodiment, a method for estimating the residual energy of an electric energy accumulator is therefore provided, wherein the electric energy accumulator supplies an electric assistance traction drive of a motor vehicle with electrical energy. In the case of an electric vehicle, the electric energy accumulator also supplies an electric standard traction drive which relates to one of the axles. In the case of a hybrid vehicle, the electric assistance drive can be used as the sole type of drive, without using an internal combustion engine. In the case of a hybrid vehicle it is possible by virtue of a necessary all-wheel drive that the electric assistance drive must serve to provide traction in addition to the internal combustion engine, although initially a pure internal combustion engine operating mode was planned for the respective section of route. As a result of the all-wheel assistance, the range for the electric drive is reduced based on the electric assistance drive, with the result that at the end of the section of route lying ahead a shorter range is available for the purely electric driving.

The method provides that a future operating intensity of the assistance traction drive is determined based on at least one input. The input characterizes the driving style of a section of route lying ahead. The term operating intensity denotes a variable which represents the duration, power and/or length of a section of route for which the assistance traction drive is used. The operating intensity represents how long and to what extent the assistance traction drive will be used for the section of route lying ahead.

The method also provides for an energy component of an amount of energy of the energy accumulator to be reserved. The amount of energy corresponds to the total amount of energy available.

The energy component reserved in this way is determined from the determined future operating intensity based on a prescribed consumption parameter. The consumption parameter sets the operating intensity in relation to an amount of energy which the operating intensity requires. The consumption parameter corresponds, for example, to an amount of energy relating to a section of route in which the assistance traction drive is used, or a time for which the assistance traction drive is operated. The operating intensity can alternatively, or in combination therewith, depend on a power level or on a power level profile, wherein the power is requested by the assistance traction drive during the operation thereof. The consumption parameter therefore characterizes the drive-specific consumption of electrical energy by the electric assistance traction drive. The drive-specific consumption is an amount of energy which is requested by the assistance traction drive when the latter is operated. The drive-specific consumption can be standardized to the section of route with active operation or to the time period with active operation.

Finally, there is provision that the residual energy is estimated by reducing the total amount of energy available by the reserved energy component. The residual energy is here the amount of energy which is still available for retrieval in the electric energy accumulator after the section of route lying ahead, or a part thereof, has been traveled along completely. The residual energy is therefore obtained by reducing the originally assumed available amount of energy by the reserved energy component which represents the additional consumption by the assistance traction drive.

The future operating intensity is determined, in particular, based on a length and/or based on a speed profile of the section of route lying ahead. The length of the section of route corresponds to the section of route which is to be traveled along and which is necessary to overcome the section of route. The speed profile corresponds to a function of the speed in accordance with the position of the section of route lying ahead, wherein the speed profile represents the speed and the acceleration or power at which the assistance traction drive is operated on the section of route lying ahead. The speed profile can be prescribed by speed values which relate to individual parts of the section of route. The length corresponds, in particular, to the length over which the assistance traction drive is used. The operating intensity can correspond, in particular, to the integral of the speed profile over the length and therefore represents a weighted sum of parts of the section of route, wherein each part of the section of route is multiplied by the associated speed. In addition, the operating intensity can also be a duration for which the assistance traction drive will be operated in the sections of route lying ahead. The operating intensity can therefore correspond to a length, to a speed profile or to a duration, or can correspond to a combination of all the variables or of only two of these variables. The variables can be combined by multiplication and in particular by summing or integrating the values resulting from the multiplication.

In the text which follows there is a more detailed explanation of which data or which input is used as the basis for determining the future operating intensity. The input for this can be divided into static route information which represents the properties of the section of route without reference to the traffic, traffic data which characterizes the traffic flow, individual traffic participant data which represents a property or a state of a specific traffic participant, for example a vehicle traveling ahead, vehicle state information which represents the state or the current operating parameters of the motor vehicle in question, data on the operating intensity which has been determined and buffered during previous journeys along the same section of route, as well as driver prescriptions which are to be implemented directly and which represent the operating state of the assistance traction drive.

The input which characterizes the driving style of a section of route lying ahead can therefore be a driver's request input. The driver's request input represents the activation of the assistance traction drive for a time, for a time window or for a section of route. The driver's request input can relate to the current time or to the current position of the motor vehicle, or can relate to parts of the section of route lying ahead in the sense of pre-programming. The driver's request input represents the fact that for the respective part of the section of route (for example a part of the section of route lying ahead) or starting from a specific point on the section of route, the activation of the assistance traction drive is desired and is carried out. It is possible to provide an operator interface for the driver, for example a simple pushbutton key, a switch or more complex input devices such as a keypad, touch screen or mouse, for the driver's request input, in order to define the section of route or the time period for which the assistance traction drive is to be used.

The input can also be provided by means of navigation data of a navigation system of the motor vehicle. The navigation data characterizes a radius of a bend which is below a predefined limit, a degree of unevenness which is above a predefined limit and/or a traffic regulation prescription for the use of traction assistance measures (for example in the sense of a requirement to fit snow chains) of the section of route lying ahead. Based on the information data it is therefore possible to detect tight bends which, for example in conjunction with speed prescriptions, make it possible to infer that the assistance traction drive will be used at the respective location. A high section of route density of radii of bends which are below the predefined limit can also be used, since a high density of tight bends indicates switchbacks which are in turn usually associated with activation of the assistance traction drive. The degree of unevenness can be determined, for example, from the type of the section of route (country road or the like), wherein this data results readily from the navigation data. The navigation data can be input via an interface in order to process said data according to the method. The interface is configured to be connected to a navigation system. A vehicle-side device, with which, for example, routes can be planned and navigation data can be processed, is referred to as a navigation system.

The input can additionally comprise current or general roadway state information. The term current roadway state information refers to information which is temporary and therefore depends on the external events such as the weather conditions, reworking of the roadway or the like. General roadway state information is information which is constant over the long term compared to the current information, for example coefficients of friction of a section of route, which represent a normal roadway state (for example "dry"). The roadway state information is therefore, in particular, coefficients of friction of the section of route lying ahead, current weather conditions, current traffic conditions of the section of route lying ahead, or information which can be derived therefrom and which represents the drivability or the adhesion properties of the roadway. The roadway state information can be prescribed, for example stored in a navigation device, in particular the general roadway state information. Current roadway state information can be output, in particular, by a traffic service, in particular by radio transmission to the vehicle. The traffic service can therefore be mobile-radio based or can be transmitted over a traffic message channel (for example the traffic message channel, TMC) by VHF radio. However, these are only two specific examples of a multiplicity of possibilities, wherein in addition the services of telematic systems or of other traffic information systems can also be used.

A further possibility is that the input is vehicle state information which originates from other vehicles. This is, in particular, information which is from a vehicle within a predetermined radius of the vehicle in question, in particular vehicles which are located on the section of route lying ahead or which are in the transmission range of the vehicle in question. The information can be compiled as information which originates from a third-party vehicle and is transmitted to the motor vehicle in question, which can also be referred to as the driver's own vehicle, wherein the driver's own vehicle corresponds to the motor vehicle whose residual energy is estimated.

The vehicle state information of the third-party vehicle is variables which represent the driving operation of the third-party vehicle or of the vehicle traveling ahead, wherein the driving operation is characterized by the type of drive (all-wheel/single-axle drive), ABS activity, inclination or other information which represents the activity of traction-relevant systems of the third-party vehicle. In addition, the information of the third-party vehicle, for example measuring signals, supervision signals or warning signals, are associated with the driving state of the motor vehicle. These signals comprise warning signals such as the flashing hazard warning system, the ice warning system or even supervision signals such as the outside temperature. For this reason, the vehicle state information of the vehicle traveling ahead or of the third-party vehicle comprises, in particular, information about the operation of an all-wheel drive of the vehicle traveling ahead, information about the active operation of a driving safety system, information about the inclination, about the operation of the flashing hazard warning system, about the active operation of an ice warning system and/or ambient temperature information of the vehicle traveling ahead. The term vehicle traveling ahead can be used here as a synonym for the term third-party vehicle. The data can be transmitted from the third-party vehicle to the driver's own vehicle by means of car-to-car communication or by means of car-to-X communication, for example according to IEEE 802.11p, in particular by means of point-to-point radio links or else by means of mobile radio links.

A further possibility is that the input comprises vehicle state information which originates from a system or a sensor or else from a closed-loop or open-loop control process of the motor vehicle whose residual energy is being estimated. In this context, a vehicle-based device component, in particular an open-loop or closed-loop control device or else a monitoring device or measuring device, is to be understood as the system. The vehicle state information which originates from a system or sensor of the motor vehicle is, in particular, information which represents the driving operation state of the motor vehicle, i.e. operating variables of the traction control components or vehicle control components or of regulating systems or warning systems which are associated therewith. For this reason, the input can be information about the active operation of a driving safety system of the motor vehicle (for example anti-lock brake system or other regulating systems for the wheel slip). The information can also represent an inclination of the motor vehicle, in particular information about the flashing hazard warning system of the motor vehicle, information about the active operation of an ice warning system of the motor vehicle or ambient temperature information of the motor vehicle. In particular, an ambient temperature at or below the freezing point of water can be used as information. It is to be noted that the vehicle state information described here can relate to the driver's own vehicle (=the motor vehicle) and also to the vehicle traveling ahead (=third-party vehicle), as stated in the preceding paragraph, or vice versa.

Furthermore, stored information which represents the operation of the assistance traction drive of the motor vehicle over a previous journey along this section of route can be used as the input. This applies, in particular, also to the section of route of the motor vehicle which is currently lying ahead. In addition, stored information from vehicles can be used which has arisen when driving along the section of route lying ahead at previous points in time, and has been buffered. This data can be transmitted to the motor vehicle (=the driver's own vehicle), for example if in one household a plurality of vehicles are used to travel along the same section of route, the result being that an exchange of data can take place between these vehicles. The exchange of data can relate to the operation of the assistance traction drive, or can comprise the vehicle state information described above.

The abovementioned possibilities of the input which characterizes the driving style on the section of route lying ahead can also be connected to one another, for example, by logical operations or else by (weighted) summing of values which represent at least two of these specified information items. In addition, a look-up table can be used which comprises different values or value intervals for at least two of the information items and provides indications for these values or value intervals which are associated therewith and which characterize the driving style of the section of road lying ahead and/or characterize the operating intensity and/or the reserved energy component. Finally, an interpolation method can be used which assigns the specified information a value which characterizes the driving style or which characterizes the operating intensity or which characterizes the reserved energy component. The interpolation can comprise one or more variables which represent in each case one of the abovementioned information items numerically, with the result that the interpolation can have a unidimensional or multi-dimensional dependence on variables which represent numerically one, two or more than two of the information items mentioned here.

According to a further aspect of the procedure described above, range information is determined which is output via an indication. The indication can be visual or acoustic or else also a haptic or tactile indication, for example in the form of a mechanical resistance during the activation of one of the pedals of the vehicle, in particular the accelerator pedal. The range information is calculated from the estimated residual energy and the consumption, in particular by multiplication of these variables. In the case of acoustic or visual representation, the range information can be represented precisely in a numerical form or else reproduced as an analog representation. In the case of haptic or tactile indication, the values can, of course, only be represented very roughly, in the simplest case by a resistance when a range limit is undershot, which resistance does not otherwise occur.

A further aspect is to use the range information, in addition to the abovementioned calculation and indication, actively for the operation of the motor vehicle. However, the indication can also be merely optional, with the result that only the operation of the motor vehicle is carried out according to the estimated residual energy. Therefore, a method is provided for operating the motor vehicle with a hybrid drive, wherein the method described here is carried out. The operation of an internal combustion engine of the motor vehicle and of the assistance traction drive, already described, of the motor vehicle is subjected to open-loop or closed-loop controllers as a function of the estimated residual energy and therefore of the determined future operating intensity or of the reserved energy component. In particular, the charging of the motor vehicle before the travel along the section of route lying ahead can be considered to be an operation of the vehicle in addition to the use of the motor vehicle by driving. When the motor vehicle is charged, the amount of charge depends on the reserved energy component. In the case of a relatively large reserved energy component, a larger amount of charge (i.e. a larger quantity of electrical energy) is used for the charging than in the case of a relatively small reserved energy component. Therefore, the motor vehicle is charged to a greater extent as the reserved energy component increases, in order to compensate, partially or completely, the future additional consumption by the additional drive by means of the relatively large amount of charge.

According to one embodiment, the operation of the internal combustion engine (which can drive the electric machine to generate current, and the operation of the assistance traction drive is controlled as a function of a prescribed minimum state of charge and, in particular, as a function of the current state of charge, preferably as a function of the difference between the two. This minimum state of charge corresponds to a safety margin, comparable to the reserve volume of a petrol tank. The minimum state of charge corresponds to a state of charge which the electric energy accumulator is to at least have at the end of the section of route lying ahead.

Alternatively and/or additionally, the operation of the internal combustion engine can be effected as a function of a filling level of a fuel tank which supplies the internal combustion engine with fuel. If the filling level of the fuel tank drops below a predefined limit, the assistance traction drive can be deactivated in order to increase the range and save fuel. This deactivation can, in turn, be dependent on the abovementioned information, in particular on weather information or roadway state information of a traffic service or of a vehicle traveling ahead, with the result that, in the case of a roadway state quality which is below a quality standard or in the case of risk of traction loss above a prescribed parameter, the assistance traction drive is not deactivated despite a low filling level or minimum state of charge, in order to ensure safe driving.

Furthermore, a device for estimating residual energy of an electric energy accumulator is described. The electric energy accumulator supplies an electric assistance drive of a motor vehicle with electrical energy. The residual energy estimation can be carried out with the method described here, wherein the electric accumulator, the electric assistance drive and the motor vehicle of the device correspond to the respective components, as are explained with reference to the method described here.

The device comprises an operating prediction apparatus for determining a future operating intensity, in particular the operating intensity, described here, of the assistance traction drive. The operating detection apparatus comprises a data input interface. The data input interface is configured to receive the information described here, in particular messages or values which characterize the driving style of the section of route lying ahead of the motor vehicle. A navigation device can be provided in which the section of route lying ahead is stored.

The device also comprises an apportioning apparatus with an input connection. The input connection is configured to receive the input described here. The input connection is configured to receive a consumption parameter which characterizes the drive-specific consumption of electrical energy by the electric assistance drive. For this purpose, the device can comprise a memory in which this drive-specific consumption is stored. The apportioning apparatus is also configured to assign an energy component of a total amount of energy available from the energy accumulator to a reserve. The apportioning apparatus has an input connection which is configured to receive the total amount of energy available.

The apportioning apparatus is equipped with a calculation function which determines the energy component which is assigned to the reserve from the determined future operating intensity based on the consumption parameter. The calculation function can be implemented in the apportioning apparatus by means of a processor and software which runs thereon and is also stored in the apportioning apparatus, in particular in a program memory of the apportioning apparatus.

The device also comprises a range correction apparatus having an input connection and an output connection. The input connection of the range correction apparatus is connected to the apportioning apparatus. By means of the connection, the range correction apparatus is configured to receive from the apportioning apparatus the energy component which is assigned to the reserve. The range correction apparatus also comprises a correction function. The latter can be calculated by means of a processor and associated software which is stored in a memory in the range correction apparatus. The correction function is configured to reduce the total amount of energy available by the energy component which is assigned to the reserve.

The apparatuses described here can be stored as a program or as software in a memory which is connected to a processor which is configured to execute the programs.

In addition, a control apparatus of a hybrid drive of a motor vehicle is described. This control apparatus comprises the device described above. The control apparatus comprises an output connection which is configured to output control signals with which an internal combustion engine controller, an electric motor controller and an energy accumulator controller of the hybrid drive are controlled. The control apparatus also comprises an input connection. The input connection of the control apparatus is connected to the output connection of the range correction apparatus. The control apparatus is configured to control the operation of the internal combustion engine controller, of the electric motor controller and/or of the energy accumulator controller as a function of the estimated residual energy. The correction of the range and the control resulting therefrom have already been described above based on the method and can be used for the control apparatus. In particular, in the case of a range which is below a predefined limit, the power of the electric motor of the hybrid drive can be choked by prescribing an upper limit. This prescription can also be stored in a memory in the control apparatus or in the device described above.

FIG. 1 shows a schematic illustration of a motor vehicle for carrying out the method described here, which motor vehicle also has a device and a control apparatus as disclosed here. In addition, further components are illustrated which serve as an information source for the method described here. FIG. 1 shows merely a specific embodiment of the method described here and of the devices as described here and serves to explain the general concept as described here.

FIG. 1 shows a motor vehicle 10 with an energy accumulator 20 in the form of a traction battery. In addition, the motor vehicle 10 comprises a control apparatus 22 according to one embodiment of the invention with an output connection 24, which is connected via an energy accumulator controller 26 to the energy accumulator 20. The illustrated connection serves merely to illustrate the functional association, wherein the energy accumulator controller controls the flow of current from and to the energy accumulator 20. The energy accumulator 20 is also functionally connected to an assistance traction drive 30 in order to supply electrical power thereto. The assistance traction drive 30 is electric and converts the electrical energy of the battery into kinetic energy, and vice versa. The electric assistance drive 30 comprises an electric motor controller which is functionally connected to the output connection 24 of the control apparatus 22 via the illustrated dashed line. By means of this connection, the output connection 24 of the control apparatus 22 can control the power flow from the electric energy accumulator 20 to the assistance traction drive 30, and vice versa.

The control apparatus 22 comprises an apparatus 40 for estimating the residual energy of the electric energy accumulator 20. This apparatus 40 comprises an operating detection apparatus 50 for determining a future operating intensity of the assistance drive 30. The operating detection apparatus 50 comprises a data input interface 52. The latter is configured to receive messages, values or general information which characterize the driving style of the motor vehicle on the section of route lying ahead. This information is illustrated symbolically as a dotted arrow.

The device 40 for estimating the residual energy also comprises an apportioning apparatus 60 which has an input connection 62. This input connection 62 is configured to receive a consumption parameter which characterizes the drive-specific consumption of electrical energy by the electric assistance traction drive 30. This input connection 32 is connected, for example, to a data memory in which a corresponding value or a corresponding value table is stored. This value or this value table characterizes the efficiency or the performance characteristic curve of the electric assistance traction drive 30. The apportioning apparatus 60 is also configured to assign an energy component of a total amount of energy available from the energy accumulator 20 to a reserve. The apportioning apparatus 60 has an input connection which is configured to receive the total amount of energy available, wherein this input connection and the input connection for receiving consumption parameters are illustrated as a common input connection 62 in FIG. 1.

The total amount of energy available is determined by an estimating apparatus which calculates the state of the charge of the energy accumulator 20. This estimating apparatus can be provided by the device for estimating the residual energy and is not represented in FIG. 1 for reasons of clear illustration. The apportioning apparatus is also equipped with a calculation function 64 which determines the energy component which is assigned to the reserve from the determined future operating intensity based on the operating parameter. The operating intensity is provided here by the operating detection apparatus 50, and the consumption parameter is input into the apportioning apparatus 60 via the input connection 62, with the result that the calculation function 64 only has to be connected in a functional fashion to these two components. The calculation function 64 can, in particular, be provided as a multiplier element. The calculation function 64 can alternatively be implemented as a program section which runs on a processor.

In addition, the device 40 for estimating the residual energy comprises a range correction apparatus 70 with an input connection 72 and an output connection 74. The input connection 72 of the range correction apparatus 70 is connected to the apportioning apparatus 62. As a result, the input connection 72 is configured to receive from the apportioning apparatus 60 the energy component which is assigned to the reserve. This energy component was determined, as noted above, by the calculation function 64 of the apportioning apparatus 60. A correction function 76 of the range correction apparatus 70 reduces the total amount of energy available by the energy component which is assigned to the reserve. The correction function 76 can be provided, in particular, as a subtractor element, and alternatively as a program section which runs on a processor. Therefore, a value which corresponds to a corrected range is output at the output connection 74 of the range connection apparatus.

The corrected range can either be output to the control apparatus 22 via an actuating apparatus 90 and taken into account as the corrected range during the operational control of the drive of the motor vehicle 10. Alternatively or in combination therewith, the information which is present at the output connection 74 of the range correction apparatus 70 can also be represented on a display or indicating means 92 which displays or indicates the remaining range for the motor vehicle. Whereas only the device 40 is necessary to display or indicate the corrected range, in order to take into account the corrected range during the operation of the motor vehicle the actuating apparatus 90 would output an actuation signal to the output connection 24 of the control apparatus 22 in accordance with the control data.

The output connection 24 of the control apparatus 22 controls an internal combustion engine controller 82 of the vehicle, the electric motor controller 32 and/or the energy accumulator controller 26 via the illustrated functional connections. Since the controller 82 of the internal combustion engine is optional, the connection to the internal combustion engine controller 82 and the internal combustion engine controller 82 itself and the internal combustion engine 80 are represented by dashed lines. The connection to the electric motor controller 32 is also optional, since the energy accumulator controller can also control, and, in particular, choke the outputting of energy to the electric motor by selected choking of the outputting of energy. In an alternative embodiment (not illustrated), the internal combustion engine controller 82, the electric motor controller 32 and the energy accumulator controller 26 can be part of the device 40. In the illustrated embodiment in figure 1, the output connection 24 of the control apparatus 22 is configured to be connected to the internal combustion engine controller 82, to the electric motor controller 32 and to the energy accumulator controller 26. The data input interface 52 of the operating prediction apparatus 50 is configured to receive information which represents operation of the assistance traction drive 30 on the section of route lying ahead of the motor vehicle 10.

A number of information sources which supply this information to the data input interface 52 are illustrated below. A navigation system 100 of the motor vehicle 10 makes available navigation data which represents, for example, the gradient or a radius of a bend or else a degree of unevenness or a condition of the road. Based on this information it is possible to make direct inferences about the imminent operation of the assistance traction drive, for example by means of a prescribed assignment. The navigation system is here a device which stores road data, in particular on the section of route lying ahead of the motor vehicle 10 which data can also be referred to as navigation data. In addition, an operator interface 110 can be provided at which the driver directly inputs the desired operation of the assistance traction drive. This can be provided as a touch screen or else as a simple pushbutton key or switch with which an all-wheel operating mode can be input.

In addition, a radio station 120 can be provided which outputs by radio current or general roadway state information relating, inter alia, to the section of route lying ahead of the motor vehicle 10. For the purpose of reception, the vehicle can have a corresponding receiver, for example in the form of a VHF receiver with a TMC (traffic message channel) function. The arrow represented by dotted lines can represent such a receiver whose traffic data is passed on to the data input interface 52.

Furthermore, a vehicle 130 driving ahead can have a traction control apparatus, which can also be referred to as an ABS system or traction control system. In addition, the vehicle 130 traveling ahead can have an external temperature sensor 132b. These two components 132a, b of the vehicle 130 traveling ahead are only exemplary embodiments of information sources about the state of the vehicle or operating state of the vehicle 130 traveling ahead or information sources about the surroundings or the condition of the roadway at the location at which the vehicle 130 traveling ahead is located. In this context, for example the traction control apparatus 132a outputs an active signal if it is activated once or more frequently (with respect to a time interval), with the result that it can be inferred therefrom that the assistance traction drive is activated at the location of the vehicle 130 traveling ahead. This is also the case if the external temperature sensor 132b indicates a temperature below the freezing point, with the result that there is a risk of a roadway covered in ice, and therefore likewise the activation of the assistance traction drive is probable. The transmission from the vehicle 130 to the motor vehicle 10 can be provided by means of a direct radio link, i.e. by means of a car-to-car communication system, or it can be transmitted with mobile radio support. If appropriate, the link can have, in addition to the mobile radio link, a connection via the Internet, with the result that the data of the vehicle 130 is initially transmitted into the Internet, for example on a server from which the motor vehicle 10 can retrieve this data again.

The motor vehicle 10 can likewise have a traction control apparatus 142a and an external temperature sensor 142b, wherein these information sources are only exemplary. If the traction control apparatus 142a is activated frequently, it is to be assumed that the assistance traction drive is activated. This applies likewise in the case of external temperatures below the freezing point which the external temperature sensor 142b senses. Further exemplary information sources which can be used in combination with or instead of the components 132a, 132b, 142a, 142b are, for example, inclination sensors, acceleration sensors, which can detect, for example, rolling of the vehicle, for example yaw angle sensors, longitudinal acceleration sensors and lateral acceleration sensors, or flashing hazard warning systems, ice warning systems or controllers or evaluation devices which operate with these components. Instead of or in combination with sensors for specific variables, monitoring devices, open-loop or closed-loop control devices can be used which process or determine at least one of the variables which are detected by the specified sensors. The specified monitoring devices, open-loop or closed-loop control devices are each a system from which vehicle state information of the motor vehicle or of the third-party vehicle originates. For example, drive monitoring can determine from the difference between the torque which is output and the change in the speed the angle of inclination which is used within the scope of the method described here. This relates to monitoring devices, open-loop or closed-loop control device of the driver's own vehicle and of the third-party vehicle.

Finally, a memory 150 can serve as an information source in which information about the section of route lying ahead can be represented, said information originating from a previous journey along the section of route lying ahead, either by the driver's own vehicle 10 or by other vehicles whose data has been transmitted into the memory 150. In particular, information about the operation of the assistance traction drive during previous journeys can be stored in the memory 150, said information being, if appropriate, output in conjunction with other information, as by the information sources mentioned here.

The arrow illustrated by a dotted line in figure 1 represents not only the direction of information but can also stand for a logic or arithmetic combination of the information items, for example a weighted combination and/or a look-table which converts supplied information into a value which represents the probability of an assistance traction drive or the duration or the intensity of the operation. The arrow can also represent evaluation functions with which the information is converted into values which the data input interface 52 can acquire.

This evaluation can comprise an external temperature indication being related to the freezing point with respect to water, or in that coefficients of friction or information about current weather conditions from the route lying ahead is converted into values which can be output to the data input interface 52.

The double line arrow between the assistance traction drive 30 and a rear wheel of the vehicle which is illustrated as a semicircle on the left-hand side represents the transmission direction of the kinetic traction power.

LIST OF REFERENCE SYMBOLS

10 Motor vehicle, driver's own vehicle
20 Electric energy accumulator
22 Control apparatus
24 Output connection of the control apparatus
26 Energy accumulator controller 30 Electric assistance traction drive, electric machine, in particular driving the rear axle of the motor vehicle
32 Electric motor controller
40 Device for estimating residual energy
50 Operating prediction apparatus
52 Data input interface of the operating prediction apparatus
60 Apportioning apparatus
62 Input connection of the apportioning apparatus
64 Calculation function of the apportioning apparatus
70 Range correction apparatus
72 Input connection of the range correction apparatus
74 Output connection of the range correction apparatus
76 Correction function of the range correction apparatus
80, 82 Internal combustion engine, internal combustion engine controller
90 Actuating apparatus of the control apparatus
92 Display or indicating means
100 Navigation system
110 Driver's request input, operator input
120 Transmitting station of a traffic service
130 Vehicle traveling ahead
132a Driving safety system, ABS or traction control system of the third-party vehicle or of the vehicle 130
132b External temperature sensor of the third-party vehicle or of the vehicle 130
142a Driving safety system of the motor vehicle 10 or of the driver's own vehicle
142b External temperature sensor of the motor vehicle 10 or of the driver's own vehicle
150 Memory

What is claimed is:

1. A method for estimating a residual energy of an electric energy accumulator that supplies an electric assistance traction drive of a motor vehicle with electrical energy, the method comprising:
estimating a future operating intensity of the assistance traction drive based on an input that characterizes a driving style of a section of route lying ahead;
determining a reserved energy component of the total amount of energy available from the energy accumulator based on the determined future operating intensity and a prescribed consumption parameter that characterizes a drive-specific consumption of electrical energy by the electric assistance traction drive;
reserving the determined energy component; and
estimating the residual energy by reducing the total amount of energy available by the reserved energy component;
wherein the input that characterizes the driving style of a section of route lying ahead comprises at least one of:
navigation data of a navigation system of the motor vehicle that characterizes at least one of a gradient above a predefined limit, a radius of a bend below a predefined limit, a degree of unevenness above a predefined limit, or a traffic regulation prescription for the use of traction assistance measures on the section of route lying ahead;
current or general roadway state information, including at least one of coefficients of friction of the section of route lying ahead or current weather conditions, or current traffic conditions of the section of route lying ahead that are output by a traffic service;
vehicle state information output by a vehicle traveling ahead, including at least one of information about the operation of all-wheel drive of the vehicle traveling ahead, information about an active operation of a driving safety system of the vehicle traveling ahead, information about an inclination of the vehicle traveling ahead, information about an operation of a flashing hazard warning system of the vehicle traveling ahead, information about an active operation of an ice warning system of the vehicle traveling ahead, or ambient temperature information of the vehicle traveling ahead;
vehicle state information that originates from a system or sensor of the motor vehicle, including at least one of information about the active operation of a driving safety system of the motor vehicle, information about an inclination of the motor vehicle, information about the operation of a flashing hazard warning system of the motor vehicle, information about an active operation of an ice warning system of the motor vehicle, or ambient temperature information of the motor vehicle;
stored information regarding the operation of the assistance traction drive of the motor vehicle on the section of route lying ahead when this section of route has previously been traveled along; or
a combination of the above.

2. The method of claim 1, wherein the future operating intensity is determined based also on at least one of a length or a speed profile of the section of route lying ahead.

3. The method of claim 1, further comprising determining range information and outputting the range information via a display or indicating device, wherein the range information is calculated from the estimated residual energy and the consumption.

4. A method for operating a motor vehicle having an internal combustion engine, a hybrid drive, and assistance traction drive, the method comprising:
estimating a residual energy of an electric energy accumulator that supplies an electric assistance traction drive of a motor vehicle with electrical energy by a process comprising:
determining a future operating intensity of the assistance traction drive based on an input that characterizes a driving style of a section of route lying ahead;
determining a reserved energy component of the total amount of energy available from the energy accumulator based on the determined future operating intensity and a prescribed consumption parameter that characterizes a drive-specific consumption of electrical energy by the electric assistance traction drive;
reserving the determined energy component; and
estimating the residual energy by reducing the total amount of energy available by the reserved energy component;
controlling an operation of the internal combustion engine and an operation of the assistance traction drive as a function of the estimated residual energy;
wherein the input that characterizes the driving style of a section of route lying ahead comprises at least one of:
navigation data of a navigation system of the motor vehicle that characterizes at least one of a gradient above a predefined limit, a radius of a bend below a predefined limit, a degree of unevenness above a predefined limit, or a traffic regulation prescription for the use of traction assistance measures on the section of route lying ahead;
current or general roadway state information, including at least one of coefficients of friction of the section of route lying ahead or current weather conditions, or current traffic conditions of the section of route lying ahead that are output by a traffic service;

vehicle state information output by a vehicle traveling ahead, including at least one of information about the operation of all-wheel drive of the vehicle traveling ahead, information about an active operation of a driving safety system of the vehicle traveling ahead, information about an inclination of the vehicle traveling ahead, information about an operation of a flashing hazard warning system of the vehicle traveling ahead, information about an active operation of an ice warning system of the vehicle traveling ahead, or ambient temperature information of the vehicle traveling ahead;

vehicle state information that originates from a system or sensor of the motor vehicle, including at least one of information about the active operation of a driving safety system of the motor vehicle, information about an inclination of the motor vehicle, information about the operation of a flashing hazard warning system of the motor vehicle, information about an active operation of an ice warning system of the motor vehicle, or ambient temperature information of the motor vehicle;

stored information regarding the operation of the assistance traction drive of the motor vehicle on the section of route lying ahead when this section of route has previously been traveled along; or a combination of the above.

5. The method of claim 4, comprising further controlling the operation of the internal combustion engine and the operation of the assistance traction drive as a function of at least one of:

a prescribed minimum state of charge for the electric energy accumulator at the end of the section of route lying ahead, or a filling level of a fuel tank that supplies the internal combustion engine with fuel.

6. A device for estimating the residual energy of an electric energy accumulator that supplies an electric assistance traction drive of a motor vehicle with electrical energy, the device comprising:

an operating prediction apparatus configured to determine a future operating intensity of the assistance traction drive with a data input interface configured to receive messages or values that characterize a driving style of a section of route lying ahead;

an apportioning apparatus comprising an input connection configured to receive a consumption parameter that characterizes a drive-specific consumption of electrical energy by the electric assistance traction drive;

wherein the apportioning apparatus is also configured to assign an energy component of a total amount of energy available from the energy accumulator to a reserve;

wherein the input connection of the apportioning apparatus is also configured to receive the total amount of energy available; and the apportioning apparatus comprises a calculation function configured to determine the energy component assigned to the reserve from the determined future operating intensity based on the consumption parameter; and a range correction apparatus comprising:
an input connection and an output connection, wherein the input connection of the range correction apparatus is connected to the apportioning apparatus and is thereby configured to receive from the apportioning apparatus the energy component assigned to the reserve; and a correction function configured to reduce the total amount of energy available by the energy component assigned to the reserve;

wherein the messages or values characterize the driving style of a section of route lying ahead and comprise at least one of:

navigation data of a navigation system of the motor vehicle that characterizes at least one of a gradient above a predefined limit, a radius of a bend below a predefined limit, a degree of unevenness above a predefined limit, or a traffic regulation prescription for the use of traction assistance measures on the section of route lying ahead;

current or general roadway state information, including at least one of coefficients of friction of the section of route lying ahead or current weather conditions, or current traffic conditions of the section of route lying ahead that are output by a traffic service;

vehicle state information output by a vehicle traveling ahead, including at least one of information about the operation of all-wheel drive of the vehicle traveling ahead, information about an active operation of a driving safety system of the vehicle traveling ahead, information about an inclination of the vehicle traveling ahead, information about an operation of a flashing hazard warning system of the vehicle traveling ahead, information about an active operation of an ice warning system of the vehicle traveling ahead, or ambient temperature information of the vehicle traveling ahead;

vehicle state information that originates from a system or sensor of the motor vehicle, including at least one of information about the active operation of a driving safety system of the motor vehicle, information about an inclination of the motor vehicle, information about the operation of a flashing hazard warning system of the motor vehicle, information about an active operation of an ice warning system of the motor vehicle, or ambient temperature information of the motor vehicle;

stored information regarding the operation of the assistance traction drive of the motor vehicle on the section of route lying ahead when this section of route has previously been traveled along; or a combination of the above.

7. A control apparatus of a hybrid drive of a motor vehicle having an internal combustion engine and assistance traction drive, the control apparatus comprising:

a device for estimating the residual energy of an electric energy accumulator that supplies an electric assistance traction drive, the device comprising:

an operating prediction apparatus configured to determine a future operating intensity of the assistance traction drive with a data input interface configured to receive messages or values that characterize a driving style of a section of route lying ahead;

an apportioning apparatus comprising an input connection configured to receive a consumption parameter that characterizes a drive-specific consumption of electrical energy by the electric assistance traction drive;

wherein the apportioning apparatus is also configured to assign an energy component of a total amount of energy available from the energy accumulator to a reserve;

wherein the input connection of the apportioning apparatus is also configured to receive the total amount of energy available; and the apportioning apparatus comprises a calculation function configured to determine the energy component assigned to the reserve from the determined future operating intensity based on the consumption parameter; and a range correction apparatus comprising:
  an input connection and an output connection, wherein the input connection of the range correction apparatus is connected to the apportioning apparatus and is thereby configured to receive from the apportioning apparatus the energy component assigned to the reserve; and
  a correction function configured to reduce the total amount of energy available by the energy component assigned to the reserve;

an output connection configured to output control signals that control an internal combustion engine controller, an electric motor controller, and an energy accumulator controller of the hybrid drive; and an actuating apparatus connected to the output connection of the range correction apparatus and to the output connection of the control apparatus;

wherein the control apparatus is configured to control an operation of the internal combustion engine controller, an operation of the electric motor controller, and an operation of the energy accumulator controller as a function of the estimated residual energy;

wherein the messages or values characterize the driving style of a section of route lying ahead and comprise at least one of:

navigation data of a navigation system of the motor vehicle that characterizes at least one of a gradient above a predefined limit, a radius of a bend below a predefined limit, a degree of unevenness above a predefined limit, or a traffic regulation prescription for the use of traction assistance measures on the section of route lying ahead;

current or general roadway state information, including at least one of coefficients of friction of the section of route lying ahead or current weather conditions, or current traffic conditions of the section of route lying ahead that are output by a traffic service;

vehicle state information output by a vehicle traveling ahead, including at least one of information about the operation of all-wheel drive of the vehicle traveling ahead, information about an active operation of a driving safety system of the vehicle traveling ahead, information about an inclination of the vehicle traveling ahead, information about an operation of a flashing hazard warning system of the vehicle traveling ahead, information about an active operation of an ice warning system of the vehicle traveling ahead, or ambient temperature information of the vehicle traveling ahead;

vehicle state information that originates from a system or sensor of the motor vehicle, including at least one of information about the active operation of a driving safety system of the motor vehicle, information about an inclination of the motor vehicle, information about the operation of a flashing hazard warning system of the motor vehicle, information about an active operation of an ice warning system of the motor vehicle, or ambient temperature information of the motor vehicle;

stored information regarding the operation of the assistance traction drive of the motor vehicle on the section of route lying ahead when this section of route has previously been traveled along; or a combination of the above.

* * * * *